(12) United States Patent
Figge

(10) Patent No.: US 6,737,477 B1
(45) Date of Patent: May 18, 2004

(54) POLYURETHANES AND GRAFT COPOLYMERS BASED ON POLYURETHANE AND THEIR USE IN THE PRODUCTION OF COATING MATERIALS, ADHESIVES AND SEALING MASSES

(75) Inventor: Hans-Jürgen Figge, Münster (DE)

(73) Assignee: BASF Coatings AC, Munster (DE)

( * ) Notice: Subject to any disclaimer, the term of this patent is extended or adjusted under 35 U.S.C. 154(b) by 20 days.

(21) Appl. No.: 10/111,886

(22) PCT Filed: Oct. 9, 2000

(86) PCT No.: PCT/EP00/09848

§ 371 (c)(1),
(2), (4) Date: Apr. 26, 2002

(87) PCT Pub. No.: WO01/34672

PCT Pub. Date: May 17, 2001

(30) Foreign Application Priority Data

Nov. 6, 1999 (DE) .......................................... 199 53 446

(51) Int. Cl.$^7$ ....................... C08G 18/04; C08F 283/00; C08F 285/00
(52) U.S. Cl. ......................... 525/131; 525/454; 525/455
(58) Field of Search ................................ 525/131, 454, 525/455

(56) References Cited

U.S. PATENT DOCUMENTS

| | | | |
|---|---|---|---|
| 5,093,412 A | 3/1992 | Mente et al. ................ | 524/762 |
| 5,109,091 A | 4/1992 | Schafheutle et al. ........ | 524/561 |
| 5,589,538 A | * 12/1996 | Rex ............................ | 525/28 |
| 5,691,425 A | 11/1997 | Klein et al. ................. | 525/455 |
| 6,063,861 A | 5/2000 | Irle et al. .................... | 524/591 |
| 6,162,506 A | 12/2000 | Lettmann et al. ......... | 427/407.1 |

FOREIGN PATENT DOCUMENTS

| | | | |
|---|---|---|---|
| CA | 2073115 | 7/1992 | ......... C09D/175/14 |
| DE | 19645761 | 5/1998 | ......... C08F/283/00 |
| DE | 19722862 | 1/1999 | ......... C09D/151/08 |
| DE | 19753222 | 6/1999 | ......... C08L/75/04 |
| EP | 331 409 | 2/1989 | .............. C08J/7/04 |
| EP | 0074746 | * 10/1989 | |
| EP | 472 081 | 8/1991 | ......... C08F/222/04 |
| EP | 510 533 | 4/1992 | ........... C08G/18/63 |
| EP | 522 419 | 6/1992 | ........... C08G/18/67 |
| EP | 522420 | 6/1992 | .............. C08J/3/03 |
| EP | 608 021 | 1/1994 | ......... C09D/151/08 |

OTHER PUBLICATIONS

Chemical Abstracts Accession No. XP002159435 Abstract for JP07292046.
JAPIO Abstract for JP01256512.
T.J. Chen: "Preparation and Polymerization of new dual active functional monomers" Polym. Mater. Sci. Eng., Bd. 57, 1987, pp. 565–569, XP000926156 p. 566.
English Language for DE19645761, "entitled: Preparing polyurethane hybrid dispersions," filed Nov. 6, 1997, pp. 1–3, claims 1–3, and the Abstract on 1 page. USSN 08/965, 331.

* cited by examiner

Primary Examiner—Patricia A. Short

(57) ABSTRACT

An olefinically unsaturated, hydrophilic or hydrophobic polyurethane, which can be produced as follows: a polyurethane pre-polymer, produced by at least reacting at least one poly-isocyanate with at least one saturated and/or olefinically unsaturated higher-molecular and/or lower-molecular weight polyol in one or more stages so that, according to the statistical mean, at least one free isocyanate group per molecule still remains, is reacted with at least one compound containing at least two functional groups that are reactive to isocyanate, in such a way that no remaining free isocyanate groups are detectable. The resultant polyurethane is then reacted with at least one anhydride of an α,β-unsaturated carboxylic acid. Also, the use of the polyurethane for producing graft copolymers and to the use of the polyurethane and the graft copolymers for producing coating materials, adhesives and sealing masses.

5 Claims, No Drawings

POLYURETHANES AND GRAFT COPOLYMERS BASED ON POLYURETHANE AND THEIR USE IN THE PRODUCTION OF COATING MATERIALS, ADHESIVES AND SEALING MASSES

This application is a National Phase Application of PCT/EP00/09848 filed on 9 Oct. 2000.

The present invention relates to novel polyurethanes and novel polyurethane-based graft copolymers. The present invention also relates to novel processes for preparing polyurethanes and polyurethane-based graft copolymers. The present invention additionally relates to the use of the novel polyurethanes and the novel polyurethane-based graft copolymers for preparing coating materials, adhesives and sealing compounds.

Graft copolymers which are dispersible or soluble in water are known from European patent EP-A-0 608 021. They are composed of a core comprising a hydrophobic olefinically unsaturated polyurethane, and a shell comprising a hydrophilic acrylate copolymer having an acid number of from 30 to 120 mg KOH/g. The hydrophobic olefinically unsaturated polyurethane is prepared by reacting low molecular mass diols or polyesterdiols with an acid number of less than 5 mg KOH/g with diisocyanates and 1-(1-isocyanato-1-methylethyl)-3-(1-methylethenyl)benzene (dimethyl-m-isopropenylbenzyl isocyanate) to give, in particular, terminal ethylenearylene groups. Subsequently, a mixture of olefinically unsaturated monomers is polymerized in solution in the presence of the hydrophobic olefinically unsaturated polyurethane, after which the resulting graft copolymer is neutralized and dispersed in water to give a secondary dispersion.

It is essential here that the olefinically unsaturated groups must be introduced into the polyurethanes by way of compounds which contain at least one olefinically unsaturated group and at least one isocyanate group in the molecule.

German patent DE-C-197 22 862 discloses a graft copolymer obtainable by polymerizing olefinically unsaturated monomers in a dispersion of an olefinically unsaturated polyurethane which contains hydrophilic functional groups and has on average from 0.05 to 1.1 polymerizable double bonds per molecule, thereby giving the primary dispersion of the graft copolymer. The German patent additionally discloses a graft copolymer obtainable by polymerizing, in an organic solution of an olefinically unsaturated hydrophobic polyurethane containing on average from 0.05 to 1.1 polymerizable double bonds per molecule, a mixture of olefinically unsaturated monomers comprising at least one monomer containing carboxylic acid groups. The resulting graft copolymer is neutralized and dispersed in an aqueous medium to give a secondary dispersion.

Comparable polyurethanes and graft copolymers based on them are also disclosed by German patent application DE-A-196 45 761 or European patent applications EP-A-0 522 419 or EP-A-0 522 420.

A common feature of these known olefinically unsaturated polyurethanes is that the olefinically unsaturated groups have to be introduced by way of compounds which contain at least one isocyanate-reactive functional group and at least one olefinically unsaturated double bond.

A disadvantage here is that in order to provide the compounds introducing olefinically unsaturated double bonds into polyurethanes, the synthesis effort required is high.

In some cases it is possible, not least, for the olefinically unsaturated group content of the polyurethanes to be too low for complete grafting, so that a large part of the monomers to be grafted on form separate homopolymers and/or copolymers alongside the polyurethane, which can detract from the performance properties of the graft copolymers and of the coating materials, adhesives and sealing compounds prepared using them. This disadvantage cannot be eliminated simply by raising the double bond fraction in the polyurethanes to be grafted, since this detrimentally affects other important performance properties of the polyurethanes.

It is an object of the present invention to provide novel olefinically unsaturated hydrophilic or hydrophobic polyurethanes which have a particularly high grafting activity and are simple to obtain. It is a further object of the present invention to provide novel graft copolymers based on the novel olefinically unsaturated hydrophilic or hydrophobic polyurethanes.

Found accordingly has been the novel olefinically unsaturated hydrophilic or hydrophobic polyurethane (B) which is preparable by
  (1) reacting a polyurethane prepolymer (B1) preparable by reacting at least
     (B1.1) at least one polyisocyanate and
     (B1.2) at least one saturated and/or olefinically unsaturated high and/or low molecular mass polyol,
  with one another in one or more stages so that on average there remains at least one free isocyanate group per molecule with (2) at least one compound (B1.3) containing at least two isocyanate-reactive functional groups, so that free isocyanate groups can no longer be detected, and then
  (3) reacting the resulting polyurethane with at least one anhydride of an alpha,beta-unsaturated carboxylic acid.

Below, the novel olefinically unsaturated hydrophilic or hydrophobic polyurethane (B) is referred to as "polyurethane (B) of the invention".

Also found has been the novel graft copolymer comprising
  (A) at least one grafted-on (co)polymer and
  (B) at least one polyurethane
and preparable by radically (co)polymerizing at least one monomer (a) in solution or in emulsion in the presence of at least one polyurethane (B) of the invention.

Below, the novel graft copolymer based on the polyurethane (B) of the invention is referred to as "graft copolymer of the invention".

In the light of the prior art it was surprising and unforeseeable for the skilled worker that the object on which the present invention was based could be achieved by means of the polyurethanes (B) of the invention and of the graft copolymers of the invention. In particular it was surprising that the polyurethanes (B) of the invention and the graft copolymers of the invention can be prepared easily and in a targeted manner without any damage to the products of the invention. Another surprise is the extremely broad usefulness of the polyurethanes (B) of the invention and of the graft copolymers of the invention.

In the context of the present invention, the property of being hydrophilic refers to the constitutional property of a molecule or functional group to penetrate the aqueous phase or to remain therein. Accordingly, in the context of the present invention, the property of being hydrophobic refers to the constitutional property of a molecule or functional group to behave exophilically with respect to water, i.e., they display the tendency not to penetrate water or to depart the aqueous phase. For further details, refer also to Römpp Lexikon Lacke und Druckfarben, Georg Thieme Verlag, Stuttgart, N.Y., 1998, "hydrophilicity", "hydrophobicity", pages 294 and 295.

The polyurethane (B) of the invention contains at least one pendant and/or at least one terminal olefinically unsaturated group. In other words: the polyurethane (B) of the invention contains at least one pendant, at least one terminal, or at least one pendant and at least one terminal olefinically unsaturated group.

Examples of suitable olefinically unsaturated groups are (meth)acrylate, ethacrylate, crotonate or cinnamate groups, of which the methacrylate and acrylate groups, but especially the methacrylate groups, are particularly advantageous and are employed with particular preference in accordance with the invention.

Furthermore, the polyurethane (B) of the invention may contain further pendant and/or terminal olefinically unsaturated groups such as ethenylarylene, vinyl ether, vinyl ester, dicyclopentadienyl, norbornenyl, isoprenyl, isoprenyl, isopropenyl, allyl or butenyl groups; dicyclopentadienyl ether, norbornenyl ether, isoprenyl ether, isopropenyl ether, allyl ether or butenyl ether groups, or dicyclopentadienyl ester, norbornenyl ester, isoprenyl ester, isopropenyl ester, allyl ester or butenyl ester groups.

The polyurethane (B) of the invention is hydrophilic or hydrophobic in the aforementioned sense. In respect of their use for. preparing the graft copolymers of the invention, the hydrophilic polyurethanes (B) of the invention offer certain advantages and are therefore used with preference.

The hydrophilic polyurethanes (B) of the invention contain hydrophilic functional groups. Examples of suitable hydrophilic functional groups are those described below, of which carboxylic acid groups and/or carboxylate groups are of particular advantage and are therefore used with very particular preference in accordance with the invention.

The polyurethanes (B) of the invention may contain on average at least one blocked isocyanate group per molecule. It is preferred to employ at least two blocked isocyanate groups. In terms of the main polymer chain of the polyurethane (B) of the invention, the blocked isocyanate groups may be terminal or pendant. The blocked isocyanate groups result from the reaction of free isocyanate groups of suitable blocking agents. Examples of suitable blocking agents are those described below. In general, these groups are used when the polyurethanes (B) of the invention are to have self-crosslinking properties.

As is known, the term "self-crosslinking" refers to the property of a binder (regarding the term, cf. Römpp Lexikon Lacke und Druckfarben, Georg Thieme Verlag, Stuttgart, N.Y., 1998, "binders", pages 73 and 74) to undergo crosslinking reactions with itself. A prerequisite for this is that the binders already contain both kinds of complementary reactive functional groups which are needed for crosslinking. The term "externally crosslinking", on the other hand, is used for those coating materials, adhesives and sealing compounds in which one kind of the complementary reactive functional groups is present in the binder and the other kind in a curing or crosslinking agent. For further details of this, refer to Römpp Lexikon Lacke und Druckfarben, Georg Thieme Verlag, Stuttgart, N.Y., 1998, "curing", pages 274 and 276, especially bottom page 275.

The polyurethane (B) of the invention is obtainable by preparing, in a first process step, a polyurethane prepolymer (B1) containing at least one free isocyanate group.

The polyurethane prepolymer (B1) is of linear, branched or comb, and especially linear, construction. The linear polyurethane prepolymer (B1) contains preferably two free isocyanate groups, in particular two terminal free isocyanate groups. The branched or comb polyurethane prepolymers (B1) contain preferably at least two, in particular more than two, free isocyanate groups, with terminal free isocyanate groups being preferred.

Viewed in terms of its method, the preparation of the polyurethane prepolymers (B1) to be used in accordance with the invention has no special features but instead takes place, for example, as described in patents DE-C-197 22 862, DE-A-196 45 761, EP-A-0 522 419 or EP-A-0 522 420, by reaction of at least one polyisocyanate (B1.1), in particular a diisocyanate (B1.1), with at least one polyol (B1.2), in particular a diol (B1.2), the isocyanate component (B1.1) being employed in a molar excess so as to result in terminal free isocyanate groups.

For preparing a polyurethane prepolymer (B1) it is preferred to use diisocyanate (B1.1) and also, where appropriate, minor amounts of polyisocyanates (B1.1) for the purpose of introducing branches. In the context of the present invention, minor amounts are amounts which do not bring about gelling polyurethane prepolymers (B1) in their course of their preparation. This can also be prevented by using small amounts of monoisocyanates as well.

Examples of suitable diisocyanates (B1.1) are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimer fatty acids, as sold under the commercial designation DDI 1410 by Henkel and described in patents DO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight and in particular 20% by weight, as described by patents DE-A-44 14 032, GB-A-1220717, DE-A-16 18 795 or DE-A-17 93785; tolylene diisocyanate, xylene diisocyanate, bisphenylene diisocyanate, naphthylene diisocyanate or diphenylmethane diisocyanate.

Examples of suitable polyisocyanate (B1.1) are the isocyanurates of the diisocyanates described above.

Examples of highly suitable monoisocyanates are phenyl isocyanate, cyclohexyl isocyanate, or stearyl iso-cyanate or vinyl isocyanate, methacryloyl isocyanate and/or 1-(1-isocyanato-1-methylethyl)-3-(1-methylethenyl)benzene (TMI® from CYTEC), by means of which it is possible to introduce some of the olefinically unsaturated groups, especially ethenylarylene groups of the formula I, into the polyurethane prepolymers (B1).

Examples of suitable polyols (B1.2) are saturated or olefinically unsaturated polyester polyols which are prepared by reacting
    unsulfonated or sulfonated saturated and/or unsaturated
      polycarboxylic acids or their esterifiable derivatives,
      together where appropriate with monocarboxylic acids,
    and saturated and/or unsaturated polyols, together where appropriate with monools.

Examples of suitable polycarboxylic acids are aromatic, aliphatic and cycloaliphatic polycarboxylic acids. It is preferred to use aromatic and/or aliphatic polycarboxylic acids.

Examples of suitable aromatic polycarboxylic acids are phthalic acid, isophthalic acid, terephthalic acid, phthalic, isophthalic or terephthalic monosulfonate, or halophthalic acids, such as tetrachloro- or tetrabromophthalic acid, of which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecane dicarboxylic acid or dodecane dicarboxylic acid or maleic acid, fumaric acid or itaconic acid, of which adipic acid, glutaric acid, azelaic acid, sebacic acid, dimer fatty acids and maleic acid are advantageous and are therefore used with preference.

Examples of suitable cycloaliphatic and cyclic unsaturated polycarboxylic acids are 1,2-cyclobutane dicarboxylic acid, 1,3-cyclobutane dicarboxylic acid, 1,2-cyclopentane dicarboxylic acid, 1,3-cyclopentane dicarboxylic acid, hexahydrophthalic acid, 1,3-cyclohexane dicarboxylic acid, 1,4-cyclohexane dicarboxylic acid, 4-methylhexahydrophthalic acid, tricyclodecane dicarboxylic acid, tetrahydrophthalic acid or 4-methyltetrahydrophthalic acid. These dicarboxylic acids can be used both in their cis form and in their trans form and also as a mixture of both forms.

Further examples of suitable polycarboxylic acids are polymeric fatty acids, particularly those having a dimer content of more than 90% by weight, which are also referred to as dimer fatty acids.

Also suitable are the esterifiable derivatives of the abovementioned polycarboxylic acids, such as their monoesters or polyesters with aliphatic alcohols having 1 to 4 carbon atoms, for example. Furthermore, it is also possible to use the anhydrides of the abovementioned polycarboxylic acids, where they exist.

Together with the polycarboxylic acids it is possible if desired to use monocarboxylic acids as well, such as benzoic acid, tert-butyl benzoic acid, lauric acid, isononanoic acid or fatty acids of naturally occurring oils, for example, and also acrylic acid, methacrylic acid, ethacrylic acid or crotonic acid, by means of which some of the olefinically unsaturated groups can be introduced into the polyurethane prepolymer (B1). A preferred monocarboxylic acid used is isononanoic acid.

Examples of suitable polyols are diols and triols, particularly diols. Normally, triols are used alongside the diols in minor amounts in order to introduce branches into the polyester polyols (B1.2). In the context of the present invention, minor amounts are amounts which do not bring about gelling of the polyester polyols (B1.2) in the course of their preparation.

Examples of suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo-[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene or 1,3-(2'-hydroxypropyl)benzene.

Of these diols, 1,6-hexanediol and neopentyl glycol are particularly advantageous and are therefore used with particular preference.

The abovementioned diols can also be used as diols (B1.2) for preparing the polyurethane prepolymers (B1).

Examples of suitable triols are trimethylolethane, trimethylolpropane or glycerol, especially trimethylolpropane.

The abovementioned triols can also be used as triols (B1.2) for preparing the polyurethane prepolymers (B1) (cf. patent EP-A-0 339 433).

If desired, minor amounts of monools can be used as well. Examples of suitable monools are alcohols or phenols such as ethanol, propanol, n-butanol, secbutanol, tert-butanol, amyl alcohols, hexanols, fatty alcohols, phenol or allyl alcohol, by means of which some of the olefinically unsaturated groups can be introduced into the polyurethane prepolymer (B1).

The polyester polyols (B1.2) can be prepared in the presence of small amounts of a suitable solvent as azeotrope former. Examples of azeotrope formers used include aromatic hydrocarbons, such as xylene in particular, and (cyclo) aliphatic hydrocarbons, e.g., cyclohexane or methylcyclohexane.

Further examples of suitable polyols (B1.2) are polyester diols which are obtained by reacting a lactone with a diol. They are notable for the presence of terminal hydroxyl groups and repeating polyester units of the formula —(—CO—(CHR)$_m$—CH$_2$—O—)—. In this formula the index m is preferably 4 to 6 and the substituent R=hydrogen or an alkyl, cycloalkyl or alkoxy radical. No substituent contains more than 12 carbon atoms. The total number of carbon atoms in the substituent does not exceed 12 per lactone ring. Examples thereof are hydroxycaproic acid, hydroxybutyric acid, hydroxydecanoic acid and/or hydroxystearic acid.

Preferred for the preparation of the polyester diols (B1.2) is the unsubstituted ε-caprolactone, in which m has the value 4 and all R substituents are hydrogen. The reaction with lactone is started by low molecular mass polyols such as ethylene glycol, 1,3-propanediol, 1,4-butanediol or dimethylolcyclohexane. It is, however, also possible to react other reaction components, such as ethylenediamine, alkyldialkanolamines or else urea, with caprolactone. Other suitable high molecular mass diols include polylactamdiols, which are prepared by reacting, for example, ε-caprolactam with low molecular mass diols.

Further examples of suitable polyols (B1.2) are polyether polyols, especially those having a number-average molecular weight of from 400 to 5000, in particular from 400 to 3000. Highly suitable polyether diols (B1.2) are, for example, polyether diols of the general formula H—(—O—(CHR$^1$)$_o$—)$_p$OH, in which the substituent R$^1$=hydrogen or a lower, optionally substituted alkyl radical, the index o=2 to 6, preferably 3 to 4, and the index p=2 to 100, preferably 5 to 50. Especially suitable examples include linear or branched polyether diols (B1.2) such as poly(oxyethylene) glycols, poly(oxypropylene) glycols and poly(oxybutylene) glycols.

By means of the polyether diols (B1.2) it is possible to introduce the nonionic hydrophilic functional groups (b3) or some of them into the main chain(s) of the polyurethane prepolymers (B1).

For the preparation of the polyurethane prepolymers (B1) for use in accordance with the invention it is also possible to use further starting compounds in order to vary the profile of properties of the polyurethanes (B) of the invention and of the graft copolymers of the invention in an advantageous way.

Where the polyurethanes (B) of the invention and the graft copolymers of the invention are to have self-crosslinking properties, it is possible to use at least one compound (B1.4) containing at least one blocked isocyanate group and at least two isocyanate-reactive functional groups. Examples of suitable isocyanate-reactive groups are —SH, —NH$_2$, >NH, —OH, —O—(CO)—NH—(CO)—NH$_2$ or —O—(CO)—NH$_2$, of which the primary and secondary amino groups and the hydroxyl group are of advantage and the hydroxyl groups are of particular advantage. Examples of suitable blocking agents (B1.7) are the blocking agents known from the U.S. Pat. No. 4,444,954, of which the oximes and ketoximes xiii), especially the ketoximes xiii), specifically methyl ethyl ketoxime, offer particular advantages and are therefore used with particular preference. However, the blocked isocyanate groups can also result from the reaction of the free isocyanate groups of the polyurethane prepolymer (B1) with the blocking agents (B1.7)

In order to introduce additional olefinically unsaturated groups, especially those described above, it is possible to use at least one compound (B1.5) containing at least one olefinically unsaturated group and at least two isocyanate-reactive functional groups. Examples of suitable isocyanate-reactive functional groups are those described above. Examples of suitable olefinically unsaturated groups are likewise those described above. Examples of suitable compounds (B1.5) are known from patents DE-C-197 22 862, DE-A-196 45 761, EP-A-0 522 419 or EP-A-0 522 420. Alternatively, the additional olefinically unsaturated groups can also be introduced by way of the above-described compounds containing at least one olefinically unsaturated group and one isocyanate-reactive functional group.

For the preparation of the hydrophilic polyurethanes (B), compounds (B1.6) containing at least one hydrophilic functional group and at least two isocyanate-reactive functional groups are also incorporated into the polyurethane prepolymers (B1).

The resultant hydrophilic polyurethane prepolymers (B1) contain alternatively (b1) hydrophilic functional groups which can be converted into cations by neutralizing agents and/or quaternizing agents, and/or cationic groups, especially ammonium groups, or (b2) functional groups which can be converted into anions by neutralizing agents, and/or anionic groups, especially carboxylic acid and/or carboxylate groups.

and/or (b3) nonionic hydrophilic groups, especially poly (alkylene ether) groups.

Examples of suitable functional groups (b1) for use in accordance with the invention which can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (1) for use in accordance with the invention are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups (b2) for use in accordance with the invention which can be converted into anions by neutralizing agents are carboxylic acid, sulfonic acid or phosphonic acid groups, especially carboxylic acid groups.

Examples of suitable anionic groups (b2) for use in accordance with the invention are carboxylate, sulfonate or phosphonate groups, especially carboxylate groups.

Examples of suitable neutralizing agents for functional groups (b1) which can be transformed into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups (b2) which can be transformed into anions are ammonia or amines, such as trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine. Neutralization can take place in organic phase or in aqueous phase. As neutralizing agents, preference is given to using dimethylethanolamine and/or triethylamine.

Hydrophilic functional (potentially) cationic groups (b1) are introduced into the polyurethane prepolymers (B1) by way of the incorporation of compounds which contain in the molecule at least one, especially two, isocyanate-reactive groups and at least one group capable of forming cations; the amount to be used can be calculated from the target amine number.

Suitable isocyanate-reactive groups are the above-described groups, especially hydroxyl groups and also primary and/or secondary amino groups, of which the hydroxyl groups are used with preference.

Examples of suitable compounds of this kind are 2,2-dimethylolethyl- or -propylamine blocked with a ketone, the resulting ketoxime group being hydrolyzed together before the cationic group (b1) is formed, or N,N-dimethyl-, N,N-diethyl- or N-methyl-N-ethyl-2,2-dimethylolethyl- or -propylamine.

Hydrophilic functional (potentially) anionic groups (b2) are introduced into the polyurethane prepolymers (B1) by way of the incorporation of compounds which contain in the molecule at least one isocyanate-reactive group and at least one group capable of forming anions; the amount to be used can be calculated from the target acid number.

Examples of suitable compounds of this kind are those which contain two isocyanate-reactive groups in the molecule. Particularly suitable isocyanate-reactive groups are hydroxyl groups, and also primary and/or secondary amino groups. Accordingly, it is possible to use, for example, alkanoic acids having two substituents on the a carbon atom. The substituent can be a hydroxyl group, an alkyl group or, preferably, an alkylol group. These alkanoic acids have at least one, generally from 1 to 3, carboxyl groups in the molecule. They have from 2 to about 25, preferably from 3 to 10, carbon atoms. Examples of suitable alkanoic acids are dihydroxypropionic acid, dihydroxysuccinic acid and dihydroxybenzoic acid. One particularly preferred group of alkanoic acids are the α,α-dimethylolalkanoic acids of the general formula $R^2$—C(CH$_2$OH)$_2$COOH, in which $R^2$ stands for a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid and 2,2-dimenthylolpentanoic acid. The preferred dihydroxyalkanoic acid is 2,2-dimethylolpropionic acid. Examples of compounds containing amino groups are α,α-diaminovaleric acid, 3,4-diaminobenzoic acid, 2,4-diaminotoluenesulfonic acid and 2,4-diaminodiphenyl ether sulfonic acid.

Hydrophilic functional nonionic poly(oxyalkylene) groups (b3) can be introduced as lateral or terminal groups into the polyurethane molecules. For this purpose it is possible to use not only the above-described polyether diols but also, for example, alkoxypoly(oxyalkylene) alcohols having the general formula $R^3O$—$(—CH_2CHR^4—O—)_rH$, in which $R^3$ stands for an alkyl radical having 1 to 6 carbon atoms, $R^4$ stands for a hydrogen atom or an alkyl radical having 1 to 6 carbon atoms and the index r stand for a number between 20 and 75. (cf. patents EP-A-0 354 261 or EP-A-0 424 705).

The hydrophilic functional groups (b1) or (b2) are to be selected so as to rule out the possibility of disruptive reactions, such as salt formation or crosslinking, for instance, with the functional groups which may be present in the other constituents of the polyurethanes (B) of the invention, of the graft copolymers, of the coating materials, of the sealing compounds or of the adhesives. The skilled worker is therefore able to make the selection simply, on the basis of his or her art knowledge.

Of these hydrophilic functional (potentially) ionic groups (b1) and (b2) and the hydrophilic functional nonionic groups (b3), the (potentially) anionic groups (b2) are advantageous and are therefore used with particular preference.

The preparation of the above-described polyurethane prepolymers (B1) from the above-described starting compounds (B1.1) to (B1.7) likewise has no special method features but instead takes place on mass or in an inert organic medium, preferably in an inert organic medium, with preference being given to the use of polar organic solvents, particularly water-miscible solvents such as ketones, esters, ethers, cyclic amides or sulfoxides. The reaction here can take place in two or more stages or in one stage. It is essential that the reaction takes place until the free isocyanate group content is constant.

In a further process step, the polyurethane prepolymer (B1) for use in accordance with the invention is reacted with at least one compound (B1.3) containing at least two, preferably at least three, and in particular three isocyanate-reactive functional groups. Examples of suitable isocyanate-reactive functional groups are those described above, of which the hydroxyl groups and the amino groups, and especially the hydroxyl groups, are of particular advantage and are used with preference in accordance with the invention.

Accordingly, the preferred compounds (B1.3) comprise polyamines, polyols and amino alcohols.

Examples of suitable polyols (B1.3) are the low molecular mass polyols (B1.2) described above, tetrols such as pentaerythritol or homopentaerythritol or sugar alcohols such as threitol or erythritol or pentitols such as arabitol, adonitol or xylitol or hexitols such as sorbitol, mannitol or dulcitol.

Examples of suitable polyamines (B1.3) have at least two primary and/or secondary amino groups. Polyamines (B1.3) are essentially alkylene polyamines having from 1 to 40 carbon atoms, preferably from about 2 to 15 carbon atoms. They can carry substituents which have no hydrogen atoms that are reactive with isocyanate groups. Examples are polyamines (B1.3) with a linear or branched aliphatic, cycloaliphatic or aromatic structure and at least two primary amino groups.

Diamines (B1.3) include hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine or 4,4'-diaminodicyclohexylmethane. Preferred diamines (B1.8) are hydrazine, alkyl- or cycloalkyldiamines such as propylenediamine and 1-amino-3-aminomethyl-3,5,5-trimethylcyclohexane.

It is also possible to use polyamines (B1.3) which contain more than two amino groups in the molecule. In these cases however it must be ensured, by using monoamines as well, for example, that crosslinked polyurethane resins are not obtained. Polyamines of this kind which can be used (B1.3) are diethylenetriamine, triethylenetetramine, dipropylenediamine and dibutylenetriamine. An example of a monoamine is ethylhexylamine (cf. patent EP-A-0 089 497).

Examples of suitable amino alcohols (B1.3) are ethanolamine, diethanolamine or triethanolamine.

Of these compounds (B1.3), trimethylolpropane offers the most advantages and is therefore used with very particular preference in accordance with the invention.

The reaction of the polyurethane prepolymers (B1) with the compounds (B1.3) also has no special features in terms of its method but instead takes place on mass or in an inert organic medium, preferably in an inert organic medium, preferably using the polar organic solvents described above. It is essential that the reaction takes place until free isocyanate groups are no longer detectable.

In accordance with the invention, the resulting polyurethane is reacted with at least one anhydride of an alpha, beta-unsaturated carboxylic acid to give the polyurethane (B) of the invention.

Examples of suitable anhydrides are acrylic, methacrylic, ethacrylic or cinnamic anhydride, of which methacrylic anhydride is particularly advantageous and is therefore used with particular preference in accordance with the invention.

According to the invention, the amount of the anhydride for use in accordance with the invention varies very widely. It is limited at the top end by the number of anhydride-reactive functional groups in the polyurethanes. The lower limit is guided in particular by the number of olefinically unsaturated groups per molecule that are necessary for effective grafting of the monomers (a). The skilled worker is therefore able to determine the amount of anhydride to be used in accordance with the invention on the basis of his or her art knowledge, where appropriate with the assistance of simple rangefinding tests. It is of advantage according to the invention to use the anhydride in an amount of from 0.01 to 0.2 mol per kilogram of polyurethane.

The amount of olefinically unsaturated groups that can be introduced by way of the anhydrides for use in accordance with the invention in the polyurethanes (B) of the invention can therefore vary very widely. It is preferably from 0.01 to 3%, more preferably from 0.1 to 2.5%, with particular preference from 0.2 to 2.0%, with very particular preference from 0.25 to 1.5%, and in particular from 0.3 to 1.0% by weight, based in each case on the polyurethane (B) of the invention.

The reaction of the polyurethanes with the anhydrides has no special features as far as its method is concerned. Preferably, it takes place immediately after preparation of the polyurethane in the reaction mixture in question.

The polyurethanes (B) of the invention can already be used as they are for the preparation of coating materials, especially paints, adhesives and sealing compounds. These compositions, because they contain olefinically unsaturated groups, may also be curable with actinic radiation or both thermally and with actinic radiation (dual cure). Actinic radiation includes electromagnetic radiation such as near infrared light (NIR), visible light, UV radiation or X-rays and/or corpuscular radiation such as electron beams.

Their essential end use is, however, the preparation of the graft copolymers of the invention.

For this purpose, the polyurethanes (B) of the invention are grafted in organic solution or in a dispersion with at least one monomer (a). In accordance with the invention it is of advantage to react the polyurethanes (B) of the invention in dispersion in an aqueous medium.

The aqueous medium essentially comprises water. Said aqueous medium may include minor amounts of organic solvents, neutralizing agents, crosslinking agents and/or customary coatings additives and/or other dissolved solid, liquid or gaseous organic and/or inorganic substances of low and/or high molecular mass. In the context of the present invention, the term "minor amount" means an amount which does not destroy the aqueous nature of the aqueous medium. It is also possible, however, for the aqueous medium simply to comprise water.

For the purpose of dispersing, the hydrophilic polyurethanes (B) of the invention containing the above-described (potentially) ionic hydrophilic functional groups (b1) or (b2) are neutralized with at least one of the above-described neutralizing agents and then dispersed. In the case of the hydrophilic polyurethanes (B) of the invention containing only the nonionic hydrophilic functional groups (b3), the use of neutralizing agents is unnecessary.

The hydrophobic polyurethanes (B) of the invention can also be dispersed in an aqueous medium. This is advantageously accomplished in a high shear field. Viewed in terms of its method, this process has no special features but can instead take place, for example, in accordance with the dispersion techniques described in European patent application EP-A-0 401 565.

The resultant primary polyurethane, dispersions (B) of the invention are likewise suitable for preparing aqueous coating materials, adhesives and sealing compounds.

Examples of monomers (a) which are suitable for preparing the graft copolymers of the invention are:

Monomers (a1):

Hydroxyalkyl esters of acrylic acid, methacrylic acid of another alpha,beta-ethylenically unsaturated carboxylic acid which derives from an alkylene glycol which is esterified with the acid or are obtainable by reacting the acid with an alkylene oxide, particularly hydroxyalkyl esters of acrylic acid, methacrylic acid, crotonic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis(hydroxymethyl)cyclohexane, octahydro-4,7-methano-1H-indenedimethanol or methylpropanediol monoacrylate, monomethacrylate, monoethacrylate or monocrotonate; or reaction products of cyclic esters, such as epsilon-caprolactone, and these hydroxyalkyl esters, for example; or olefinically unsaturated alcohols such as allyl alcohol or polyols such as trimethylolpropane monoallyl or diallyl ether or pentaerythritol monoallyl, diallyl or triallyl ether. These monomers (a1) of higher functionality are generally used only in minor amounts. In the context of the present invention, minor amounts of monomers of higher functionality here are amounts which do not lead to crosslinking or gelling of the polyacrylate resins. Accordingly, the trimethylolpropane diallyl ether fraction can amount to from 2 to 10% by weight, based on the overall weight of the monomers (a1) to (a6) used to prepare the polyacrylate resin.

Monomers (a2):

(Meth)acrylic, crotonic or ethacrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate, methacrylate, crotonate or ethacrylate; cycloaliphatic (meth)acrylic, crotonic or ethacrylic esters, especially cyclohexyl, isobornyl, dicyclopentadienyl, octahydro-4,7-methano-1H-indenemethanol or tert-butylcyclohexyl (meth)acrylate, crotonate or ethacrylate; (meth)acrylic, crotonic or ethacrylic oxaalkyl esters or oxacycloalkyl esters such as ethyl triglycol (meth)acrylate and methoxyoligoglycol (meth)acrylate having a molecular weight Mn of preferably 550; or other ethoxylated and/or propoxylated, hydroxyl-free (meth)acrylic, crotonic or ethacrylic acid derivatives. These may include in minor amounts (meth)acrylic, crotonic or ethacrylic alkyl or cycloalkyl esters of higher functionality such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate, and also the analogous ethacrylates or crotonates. In the context of the present invention here, minor amounts of monomers (a2) of higher functionality are amounts which do not lead to crosslinking on gelling of the polyacrylate resins.

Monomers (a3):

Ethylenically unsaturated monomer carrying at least one acid group, preferably a carboxyl group, per molecule, or a mixture of such monomers. As component (a3) it is particularly preferred to use acrylic acid and/or methacrylic acid. It is, however, also possible to use other ethylenically unsaturated carboxylic acids having up to 6 carbon atoms in the molecule. Examples of such acids are ethacrylic acid, crotonic acid, maleic acid, fumaric acid and itaconic acid. Further, it is possible to use ethylenically unsaturated sulfonic or phosphonic acids, and/or their partial esters, as component (a3). Further suitable monomers (a3) include mono(meth)acryloyloxyethyl maleate, mono(meth)acryloyloxyethyl succinate and mono(meth)acryloyloxyethyl phthalate.

Monomers (a4):

Vinyl esters of alpha-branched monocarboxylic acids having from 5 to 18 carbon atoms in the molecule. The branched monocarboxylic acids can be obtained by reacting formic acid or carbon monoxide and water with olefins in the presence of a liquid, strongly acidic catalyst; the olefins can be products of the cracking of paraffinic hydrocarbons, such as mineral oil fractions, and can contain both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinically starting materials are, for example, propylene trimer, propylene tetramer and diisobutylene. Alternatively, the vinyl esters may be prepared conventionally from the acids by reacting the acid, for example, with acetylene. Particular preference owing to their ready availability is given to using vinyl esters of saturated aliphatic monocarboxylic acids of from 9 to 11 carbon atoms which are branched on the alpha carbon atom.

Monomers (a5):

Reaction product of acrylic acid and/or methacrylic acid of the glycidyl ester of an alpha-branched mohocarboxylic acid having from 5 to 18 carbon atoms per molecule. The reaction of the acrylic or methacrylic acid with the glycidyl ester of a carboxylic acid having a tertiary alpha carbon atom can take place before, during or after the polymerization reaction. As component (a5) is it preferred to use the reaction product of acrylic and/or methacrylic acid with the glycidyl ester of the Versatic® acid. This glycidyl ester is available commercially under the name Cardura® E10. For further details, refer to Römpp Lexikon Lacke und Druckfarben, Georg Thieme Verlag, Stuttgart, N.Y., 1998, pages 605 and 606.

Monomers (a6):

Ethylenically unsaturated monomers which are substantially free from acid groups, such as

- olefins such as ethylene, propylene, but-1-ene, pent-1-ene, hex-1-ene, cyclohexene, cyclopentene, norbornene, butadiene, isoprene, cyclopentadiene and/or dicyclopentadiene;
- (meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl-methyl(meth)acrylamide;
- monomers containing epoxide groups such as the glycidyl ester of acrylic acid, methacrylic acid, ethacrylic acid, crotonic acid, maleic acid, fumaric acid and/or itaconic acid;
- vinylaromatic hydrocarbons, such as styrene, alpha-alkylstyrenes, especially alpha-methylstyrene, arylstyrenes, especially diphenylethylene, and/or vinyltoluene;
- nitriles such as acrylonitrile and/or methacrylonitrile;
- vinyl compounds such as vinyl chloride, vinyl fluoride, vinylidene dichloride, vinylidene difluoride; N-vinylpyrrolidones; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are sold under the brand name VeoVa® by Deutsche Shell Chemie (for further details, refer to Römpp Lexikon Lacke und Druckfarben, Georg Thieme Verlag, Stuttgart, N.Y., 1998, page 598 and pages 605 and 606) and/or the vinyl ester of 2-methy-2-ethylheptanoic acid; and/or
- polysiloxane macromonomers having a number-average molecular weight Mn from 1000 to 40,000, preferably from 2000 to 20,000, with particular preference from 2500 to 10,000, and in particular from 3000 to 7000, and containing on average from 0.5 to 2.5, preferably from 0.5 to 1.5, ethylenically unsaturated double bonds per molecule, as described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A 44 21 823 or in international patent application WO 92/22615 on page 12 line 18 to page 18 line 10, or acryloxysilane-containing vinyl monomers, preparable by reacting hydroxy-functional silanes with epichlorohydrin and subsequently reacting the product of that reaction with methacrylic acid and/or hydroxyalkyl esters of (meth)acrylic acid.

From these suitable monomers (a) described by way of example above, the skilled worker is easily able to select those monomers (a) which are especially suitable for the respective end use, on the basis of their known physicochemical properties and reactivities. If desired, he or she is able to carry out a few preliminary rangefinding tests for this purpose. In particular, he or she will ensure that the monomers (a) contain no functional groups, especially (potentially) ionic functional groups, which undergo unwanted interactions with the (potentially) ionic functional groups in the hydrophilic polyurethanes (B) of the invention.

According to the invention, particular advantages result if the monomers (a) are selected in such a way that the profile of properties of the grafted-on (co)polymers is determined essentially by the above-described (meth)acrylate monomers (a), the other monomers (a) varying this profile of properties widely and advantageously.

According to the invention, very particular advantages result from using mixtures of the monomers (a1), (a2) and (a6) and also, if desired, (a3).

Viewed in terms of method, the preparation of the graft copolymers of the invention has no special features but instead takes place in accordance with the customary and known methods of radical emulsion polymerization in the presence of at least one polymerization initiator, as described, for example, in patents DE-C-197 22 862, DE-A-196 45 761, EP-A-0 522 419 or EP-A-0 522 420.

In this reaction, the monomers (a) can also be poured into a preemulsion with the aid of part of a polyurethane dispersion (B) of the invention and water, this preemulsion then being metered slowly into an initial charge in which the actual emulsion polymerization proceeds.

Examples of suitable polymerization initiators are initiators which form free radicals, such as dialkyl peroxides, such as di-tert-butyl peroxide or dicumyl peroxide; hydroperoxides, such as cumin hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfate; azo dinitriles such as azobisisobutyronitrile; C—C-cleaving initiators such as benzpinacol silyl ethers; or a combination of a nonoxidizing initiator with hydrogen peroxide. It is preferred to use water-insoluble initiators. The initiators are used preferably in an amount of from 0.1 to 25% by weight, with particular preference from 2 to 10% by weight, based on the overall weight of the monomers (a).

In the aqueous emulsions, the monomers (a) are then polymerized by means of the abovementioned radical-forming initiators at temperatures of from 0 to 95° C., preferably from 40 to 95° C., and, when using redox systems, at temperatures of 30 to 70° C. When operating under superatmospheric pressure the polymerization can also be conducted at temperatures above 100°C.

It is preferred to commence the additional initiator sometime, generally from about 1 to 15 minutes, before the monomers are fed in. Preference is also given to a procedure in which the addition of initiator is commenced at the same time as the addition of the monomers and ended about half an hour after the addition of the monomers has ended. The initiator is preferably added in a constant amount per unit time. After the end of the addition of the initiator, the reaction mixture is held at the polymerization temperature until (generally 1.5 hours) all of the monomers used have undergone substantially complete reaction. "substantially complete reaction" is intended to denote that preferably 100% by weight of the monomers used have undergone reaction but that it is also possible for a small residual monomer content of not more than up to about 0.5% by weight, based on the weight of the reaction mixture, to remain unreacted.

Suitable reactors for the graft copolymerization include the customary and known stirred tanks, stirred tank cascades, tube reactors, loop reactors or Taylor reactors, as described for example in patents DE-B-1071 241 or EP-A-0

498 583 or in the article by K. Kataoka in Chemical Engineering Science, Volume 50, Number 9, 1995, pages 1409 to 1416.

In accordance with the invention it is an advantage to select the polyurethanes (B) of the invention and the monomers (a) in such a way that the grafted-on copolymer (A) and/or the grafted hydrophilic polyurethane (B), but especially the grafted hydrophilic polyurethane (B), contain hydrophilic functional groups, especially carboxylic acid groups and/or carboxylate groups.

In the graft copolymers of the invention, the quantitative ratio of core to shell can vary extremely widely, which is a particular advantage of the graft copolymers of the invention. This ratio is preferably from 1:100 to 100:1, more preferably from 1:50 to 50:1, with particular preference from 30:1 to 1:30, with very particular preference from 20:1 to 1:20, and in particular from 10:1 to 1:10.

Given the inventively preferred use of (potentially) anionic hydrophilic functional groups (b2), especially of carboxylic acid groups, further particular advantages result if in the graft copolymers of the invention the ratio of acid number of the shell to acid number of the core is >1, preferably >3, more preferably >5, with particular preference >7, with very particular preference >9, and in particular >10.

The graft copolymers of the invention can be isolated from the primary dispersions in which they are obtained and can be put to any of a very wide variety of end uses, especially in solventborne, water- and solvent-free pulverulent solid or water- and solvent-free liquid coating materials, adhesives and sealing compounds.

In accordance with the invention, however, it is of advantage to use the primary dispersions per se for preparing aqueous coating materials, adhesives and sealing compounds or as aqueous coating materials, adhesives and sealing compounds. In their use as coating materials they exhibit outstanding film formation properties.

Besides the graft copolymers of the invention, the aqueous adhesives of the invention can contain further suitable customary and known constituents in effective amounts. Examples of suitable constituents are the crosslinking agents and additives described below, provided they are suitable for the preparation of adhesives.

Similarly, besides the graft copolymers of the invention, the aqueous sealing compounds of the invention can comprise further suitable customary and known constituents in effective amounts. Examples of suitable constituents are again the crosslinking agents and additives described below, provided they are suitable for the preparation of sealing compounds.

The primary dispersions of the graft copolymers of the invention are suitable in particular for preparing aqueous coating materials, especially aqueous paints. Examples of aqueous paints of the invention are surfacers, solid-colored topcoat materials, aqueous basecoat materials and clearcoat materials. Very particular advantages are displayed for the primary dispersions of the invention when they are used to prepare aqueous basecoat materials.

In the aqueous basecoat materials, the graft copolymers of the invention are present advantageously in an amount of from 1.0 to 50%, preferably from 2.0 to 40%, with particular preference from 3.0 to 35%, with very particular preference from 4.0 to 30%, and in particular from 5.0 to 25% by weight, based in each case on the overall weight of the respective aqueous basecoat material.

The further essential constituent of the aqueous basecoat material is at least one color and/or effect pigment. The pigments can consist of organic or inorganic compounds. Owing to this large number of suitable pigments, therefore, the aqueous basecoat material of the invention ensures a universal breadth of use and permits the realization of a large number of color shades and optical effects. Examples of suitable pigments can be found in Römpp Lexikon Lacke und Druckfarben, Georg Thieme Verlag, 1998, pages 176, "effect pigments"; pages 380 and 381 "metal oxide/mica pigments" to "metal pigments"; pages 180 and 181, "iron blue pigments" to "black iron oxide"; pages 451 to 453 "pigments" to "pigment volume concentration"; page 563, "thioindigo pigments"; and page 567 "titanium dioxide pigments".

The aqueous basecoat material can comprise at least one crosslinking agent.

Examples of suitable crosslinking agents are amino resins, compounds or resins containing anhydride groups, compounds or resins containing epoxide groups, tris (alkoxycarbonylamino)triazine, compounds or resins containing carbonate groups, blocked and nonblocked polyisocyanates, beta-hydroxyalkylamides, and compounds containing on average at least two groups that are capable of transesterification, examples being reaction products of malonic diesters and polyisocyanates or of esters and partial esters of polyhydric alcohols of malonic acid with monoisocyanates, as described in European patent EP-A-0 596 460.

Crosslinking agents of this kind are well known to the skilled worker and are offered by numerous companies as sales products.

Additionally to the constituents described above, the aqueous basecoat material of the invention may comprise customary and known binders and/or additives in effective amounts.

Examples of customary and known binders are oligomeric and polymeric, thermally curable, linear and/or branched and/or block, comb and/or random poly(meth)acrylates or acrylate copolymers, especially those described in patent DE-A-197 36 535, poyesters, especially those described in patents DE-A-40 09 858 or DE-A-44 37 535, alkyds, acrylated polyesters, polylactones, polycarbonates, polyethers, epoxy resin-amine adducts, (meth)acrylate diols, partially hydrolyzed polyvinyl esters, polyurethanes and acrylated polyurethanes, such as those described in patents EP-A-0 521 928, EP-A-0 522 420, EP-A-0 522 419, EP-A-0 730 613 or DE-A-44 37 535, or polyureas.

Examples of suitable additives are organic or inorganic fillers, thermally curable reactive diluents, low-boiling and/or high-boiling organic solvents ("long solvents"), UW absorbers, light stabilizers, radical scavengers, thermolabile radical initiators, crosslinking catalysts, deaerating agents, slip additives, polymerization inhibitors, defoamers, emulsifiers, wetting agents, adhesion promoters, leveling agents, film formation auxiliaries, rheological control additives or flame retardants. Further examples of suitable coatings additives are described in the text book "Lackadditive" [Additives for coatings] by Johan Bieleman, Wiley-VCH, Weinheim, N.Y., 1998.

The preparation of the aqueous basecoat material has no special features but instead takes place in a customary and known manner by mixing of the constituents described above in the suitable mixing equipment such as stirred tanks, dissolvers or extruders by techniques suitable for preparing the respective aqueous basecoat materials.

The aqueous basecoat material is outstandingly suitable for the production of multicoat color and/or effect paint systems by the wet-on-wet technique, in which an aqueous basecoat film is applied, dried and overcoated with a clearcoat film, after which aqueous basecoat film for clearcoat film are cured together. As is known, this technique is employed with advantage in the OEM finishing and refinish of motor vehicles.

Furthermore, however, owing to their particularly advantageous properties, the coating materials are also suitable for coating furniture and for industrial coating, including coil coating, container coating and the impregnation or coating of electrical components. In the context of the industrial coating they are suitable for coating virtually all parts for the private or industrial use such as radiators, domestic appliances, small metal parts such as nuts and bolts, hub cups, wheel rims, packaging or electrical components such as motor windings or transformer windings.

EXAMPLES

Example 1

The Preparation of an Inventive Polyurethane Dispersion (B)

In a reaction vessel equipped with stirrer, internal thermometer, reflux condenser and electrical heating, 755.4 parts by weight of a linear polyester polyol (prepared from dimerized fatty acid (Pripol® 1013), isophthalic acid and hexane-1,6-diol) with a hydroxyl number of 80 and a number-average molecular weight of 1400 daltons, 13.8 parts by weight of neopentyl glycol, 67.2 parts by weight of dimethylolpropionic acid and 363.6 parts by weight of 4,4'-dicyclohexylmethane diisocyanate (Desmodur® W from Bayer AG) were reacted with one another in 400 parts by weight of methyl ethyl ketone at 86° C. until the isocyanate group content was constant. Then, 0.95 mol of trimethylolpropane was added to the resulting polyurethane prepolymer (B1) per mole of remaining free isocyanate groups. The resulting reaction mixture was diluted with methyl ethyl ketone to a solids content of 67.5% by weight. Thereafter the reaction mixture was held at 82° C. until the free isocyanate group content had fallen below 0.25% by weight. After that, the resultant polyurethane had a cone-and-plate viscosity of from 7.5 to 9.0 dPas, measured on a solution in N-methylpyrrolidone in a weight ratio of 1:1 at 23° C. at a shear rate of 1000/s.

The solution of the polyurethane in methyl ethyl ketone was admixed with 0.05 mol of methacrylic anhydride per kilogram of resin solids and was held at 82° C. for two hours until the acid number no longer fell any further. Thereafter the solution was diluted, based on the solids content, with 10% by weight of butyl diglycol, neutralized to an extent of 51 mol% using dimethylethanolamine at 80 to 85° C., and dispersed in 2000 parts by weight of deionized water. The methyl ethyl ketone was then distilled off under reduced pressure. The resulting dispersion (B) of the invention was adjusted to a solids content of 36% by weight using deionized water. Depending on dilution, it had a pH of from 7.0 to 7.5.

Example 2

Preparation of an Inventive Graft Copolymer

A suitable reaction vessel equipped with stirrer, reflux condenser, internal temperature control and two feed vessels was charged with 2222.2 parts by weight of a polyurethane dispersion from Example 1. The first feed vessel was charged with a mixture of 137.2 parts by weight of methyl methacrylate, 145.7 parts by weight of n-butyl acrylate, 34.3 parts by weight of hydroxypropyl methacrylate, 22.6 parts by weight of methacrylic acid and 23.4 parts by weight of dimethylethanolamine for 100% neutralizing of methacrylic acid. The second feed vessel was charged with a solution of 3.4 parts by weight of tert-butyl peroxyethylhexanoate (1% based on the sum of the monomers) in 34 parts by weight of butyl diglycol. The initial charge was heated at from 80 to 85° C. At this temperature, 10% of the monomer mixture was metered in with stirring over the course of 5 minutes. After a further 10 minutes, 10% of the initiator solution was added. After this, the resulting reaction mixture was left to react for 30 minutes. The remaining monomer mixture was then metered in over three hours and the remaining initiator solution over 3.5 hours. After the end of the initiator feed, the reaction mixture was left to polymerize at from 80 to 85° C. for a further 1.5 hours. Subsequently, 430 parts by weight of butyl diglycol and 552 parts by weight of deionized water were added. The resulting dispersion had a solids content of 32% by weight with a cosolvent fraction of 14% by weight (butyl diglycol). It did not contain any coagulum; a 50 μm thick drawdown onto glass is very clean, glass-clear, and dries overnight to a very hard, very well-adhering film. The pH of the dispersion was 6.8. Its viscosity, measured in a rotational viscometer, was 130 mPas at a shear rate of 100/s and 77 mPas at a shear rate of 1000/s.

The primary dispersion of the graft copolymer of the invention was outstandingly suitable for preparing aqueous basecoat materials and surfacers.

Example 3

The Preparation of an Inventive Graft Copolymer

The graft copolymerization of Example 2 was repeated but using the following monomers (a) and solvents in the following amounts:

Feed Stream 1:

| | |
|---|---|
| 68.7 | parts by weight of methyl methacrylate, |
| 214.2 | parts by weight of n-butyl acrylate, |
| 34.3 | parts by weight of hydroxypropyl methacrylate, |
| 22.7 | parts by weight of methacrylic acid, |
| 23.5 | parts by weight of dimethylethanolamine for 100% neutralization of the methacrylic acid, and |
| 153.6 | parts by weight of butyl diglycol. |

The resulting reaction mixture was adjusted to a solids content of 36% by weight using 433 parts by weight of deionized water. The resulting dispersion had a cosolvent fraction of 9.7% by weight. It contained no coagulum: a 50 μm drawdown onto glass was very clean, glass-clear and dried overnight to a hard, very well-adhering film. The pH of the dispersion was 7.5 (1:1 dilution with water). Its viscosity, measured in a rotational viscometer, was 435 mPas at a shear rate of 100/s and 169 mPas at a shear rate of 1000/s.

The primary dispersion of the graft copolymer of the invention is outstandingly suitable for preparing aqueous basecoat materials, surfacers and adhesives.

What is claimed is:

1. A graft polymer comprising (A) at least one grafted-on (co)polymer and (B) at least one grafted polyurethane, wherein the polyurethane comprises a radical (co)polymerization product of at least one monomer in solution or in emulsion in the presence of at least one olefinically unsaturated hydrophilic or hydrophobic polyurethane comprising a reaction product of a polyurethane, wherein no free isocyanate groups are detected in the polyurethane, and at least one anhydride of an $\alpha,\beta$-unsaturated carboxylic acid, wherein the polyurethane comprises a reaction product of (1) a polyurethane prepolymer comprising a reaction product of:
   at least one polyisocyanate and
   at least one polyol, wherein the polyol is at least one of saturated and olefinically unsaturated, wherein, on average, there remains at least one free isocyanate group per molecule, and (2) at least one compound containing at least two isocyanate-reactive functional groups.

2. The graft copolymer of claim 1, wherein the grafted-on (co)polymer comprises a (meth)acrylate copolymer.

3. The graft copolymer of claim 1, wherein at least one of the grafted-on (co)polymer and the grafted polyurethane contain at least one hydrophilic functional group.

4. The graft copolymer of claim 3, wherein the grafted hydrophilic polyurethane contains at least one of a carboxylic acid group and a carboxylate group.

5. A composition comprising the graft copolymer of claim 1, wherein the composition is one of a sealing compound, an adhesive, and a coating material.

* * * * *